United States Patent

[11] 3,592,071

| [72] | Inventor | James M. Steinke |
| | | Fairport, N.Y. |
| [21] | Appl. No. | 828,562 |
| [22] | Filed | May 28, 1969 |
| [45] | Patented | July 13, 1971 |
| [73] | Assignee | Xerox Corporation |
| | | Rochester, N.Y. |

[54] BELT TRACKING APPARATUS
10 Claims, 9 Drawing Figs.

[52] U.S. Cl. .................................................... 74/241
[51] Int. Cl. .................................................... F16h 7/18
[50] Field of Search .................................... 74/240, 241

[56] References Cited
UNITED STATES PATENTS

| 2,521,071 | 9/1950 | Lister et al. | 74/241 |
| 2,821,291 | 1/1958 | Schott | 74/241 X |
| 3,066,547 | 12/1962 | Evans et al. | 74/241 |
| 3,435,693 | 4/1969 | Wright et al. | 74/241 |
| 3,500,694 | 3/1970 | Jones et al. | 74/241 |

*Primary Examiner*—Leonard H. Gerin
*Attorneys*—Paul M. Enlow, Ronald Zibelli, James J. Ralabate, Norman E. Schrader and Franklyn C. Weiss ABSTRACT: Belt tracking apparatus for use with a nonstretchable continuous belt in conjunction with a plurality of belt supporting drums or rollers. The shaft of the belt tracking drum is mounted for short pivotal movement about an axis normal to its axis, said normal axis lying in a plane that bisects the angle of the belt runs on either side of the tracking drum. With the use of belt sensing means, a mechanical feedback linkage is utilized to pivot the tracking drum about said bisecting axis in order to effect accurate belt tracking.

PATENTED JUL 13 1971 3,592,071

INVENTOR
JAMES M. STEINKE
BY *Franklyn C. Weiss*
ATTORNEY

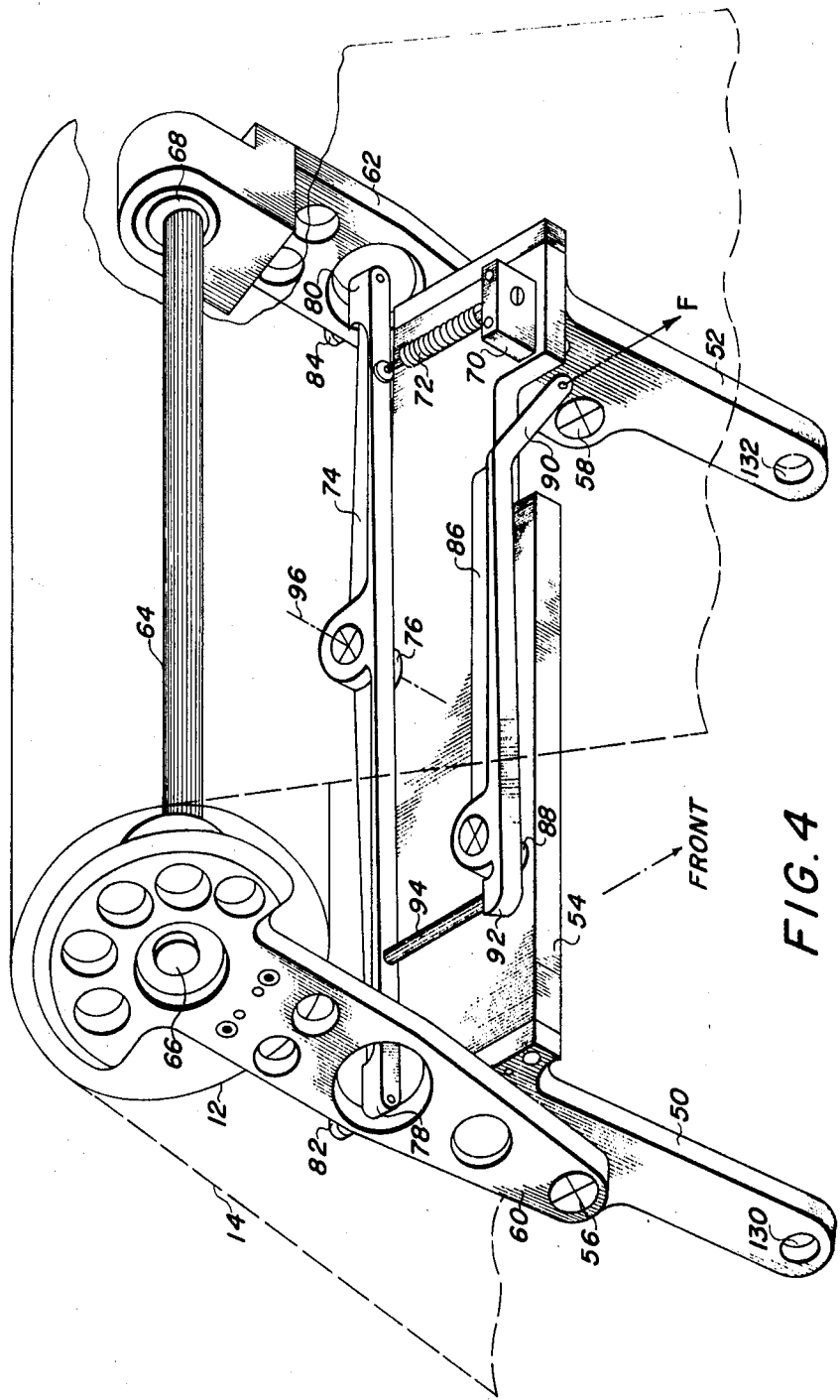

BELT TRACKING APPARATUS

BACKGROUND OF THE INVENTION

The data processing industry has progressed to the point that data processing equipment performs programmed instructions at such a rapid rate that the major limitation to the speed of the system is in the printing or recovery of the data from the data processing system. Prior art techniques of printing output information include many of the impact typewriting units or stylus scan apparatus for permanent retention of the information. Other systems include cathode ray tube printing where the image on the face of the cathode ray tube is a direct readout from the computer in an on line mode or from magnetic tapes or discs, etc. in an off line mode.

Many present day data printing and commercial automatic copiers and reproducing machines utilize xerographic photoreceptor devices to produce a high rate of output copies per minute. The photoreceptor device is usually in the form of a drum which rotates in timed unison relative to a plurality of processing stations. The limiting feature in these present day machines is the use of the xerographic drum which seriously limits the positioning and action of each of the processing devices and, in particular, the requirement of presenting a flowing image upon the xerographic drum as a document is being scanned or produced.

As the demand for faster document copying, duplicating or printout has arisen, conventional machines generally have been modified in the respective drive systems and electrical circuits in order to accomplish more effective utilization of the mechanisms already in the machine. As a solution for overcoming the multitude of disadvantages for high speed copying or data printout, present machine concepts utilize exposure of a moving photoconductor material in the form of a belt held in a flat condition at the instant of exposure. However, the use of photoconductor belts require extreme care since these belts are very delicate, are easily damaged, and the movement thereof through processing stations in a data reproduction machine must be accomplished with high precision and with as little irregular movement as possible.

OBJECTS

It is, accordingly, an object of the present invention to improve data printing or reproduction machines of the type having a belt form of photoreceptor by maintaining belt travel in accurate alignment with a predetermined path of movement.

It is another object of the present invention to improve the ability of belt handling apparatus for controlling precise movement of the belt during continuous movement thereof.

It is another object of the present invention to improve belt tracking mechanisms for an endless belt by producing corrective tracking which will produce minimum strain upon the belt.

BRIEF SUMMARY OF THE INVENTION

In accomplishing the above and other desired aspects of the present invention, applicant has invented improved apparatus for maintaining accurate belt position in a drive system utilizing an endless nonstretchable belt. Belt steering is accomplished by belt sensing rolls which ride on the edge of the belt along its path of movement. The belt rides over a drum or roller which is mounted on adjustable front and rear steering arms. As the belt tracking rollers are displaced by lateral movement of the belt, a mechanical linkage causes a motion feedback to a center point arm coupled to the front and rear steering arms. The mechanical feedback from the belt tracking rollers causes the center point arm to turn on its pivot, the axis thereof being normal to the axis of rotation of the drum and which lies in a plane that bisects the angle of the belt runs on either side of the tracking roller.

DESCRIPTION OF THE DRAWINGS

For a more complete understanding of the invention, as well as other objects and further features thereof, reference is had to the following detailed description of the invention in conjunction with the drawings wherein:

FIG. 4 is an elevational view of the belt tracking assembly as seen from the left front thereof;

DETAILED DESCRIPTION OF THE INVENTION

In all electrostatic systems such as a xerographic machine of the type in which the belt tracking system may be incorporated, a light image of information to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In high speed xerographic apparatus, substitution of the prior art xerographic drum is made by a xerographic endless belt which might be coated by a photoconductor such as selenium. During the movement of the belt, the light image is projected onto the xerographic surface of the belt, at such a speed that the relative motion of the light rays comprising the light image and the belt surface is minimal. The belt surface that intercepts the light rays comprises the layer of photoconductive material such as selenium on a conductive backing that is sensitized prior to exposure by means of a charging corona generator.

The main reason for using such a flexible belt in this type of application is that the exposure takes place on a flat surface giving the optical properties of a flat plate. The optical qualities associated with full frame exposure on a flat surface are superior to those of scanning on a moving drum. The flexible belt can then be fed around rollers and through various processing stations thus combining the efficiency of continuous processing with the optical quality of full frame exposure. However, with this type of apparatus there comes the necessity of maintaining accurate alignment between the electrostatic image produced at exposure and the drive drums or rollers imparting movement to the belt. Drift or lateral movement of the belt in its path around the drive rollers would result in improper copy position and subsequent damage to the belt itself.

Figure 1:
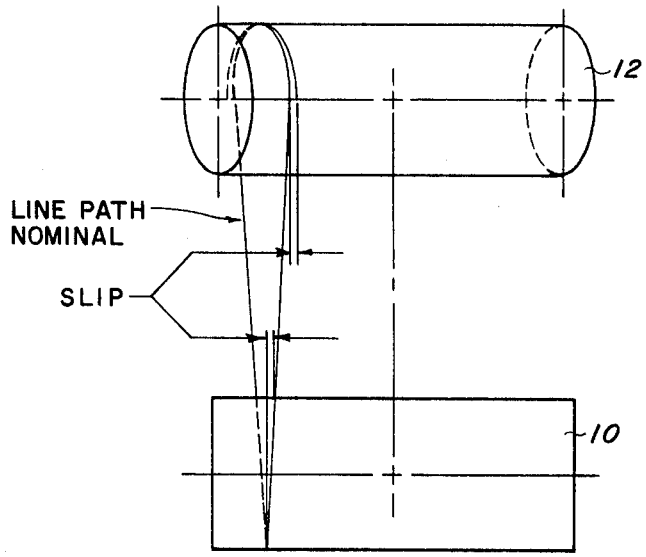
FIGS. 1, 2 and 3 are schematic diagrams of representative belt drive and tracking rollers.
Figure 2:
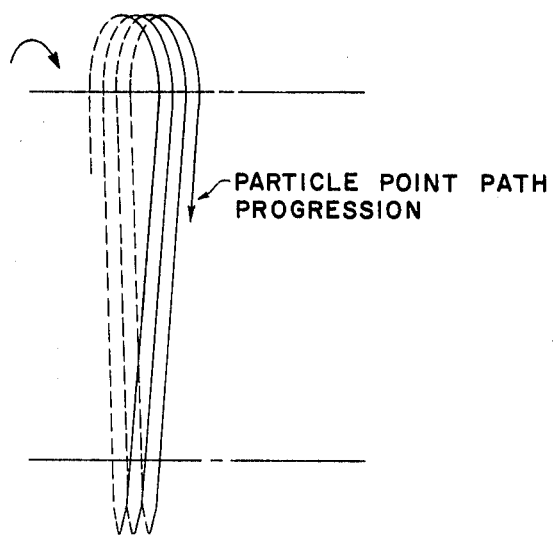
Figure 3B:
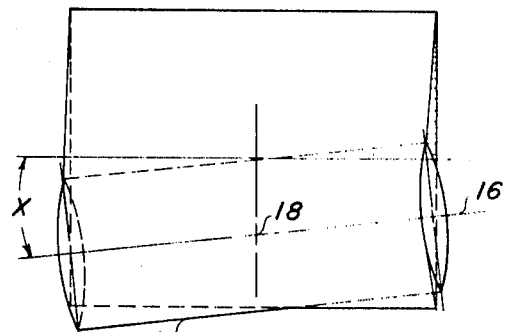
Figure 3A:
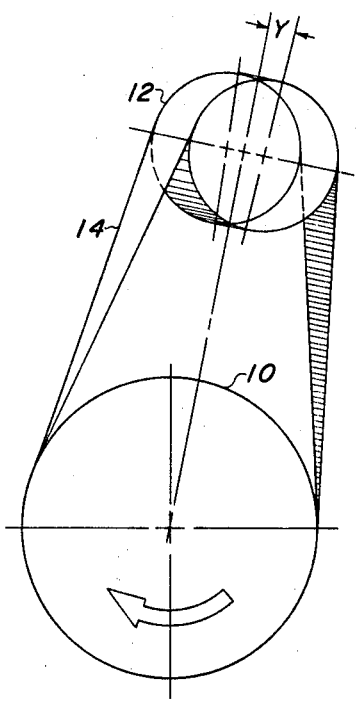

FIGS. 1, 2, and 3 of the present invention are provided to define the complexities of belt tracking, the effects of the geometry of the system, and how the steering is accomplished for better understanding of the actual embodiments seen in the later figures. FIG. 1 shows a biroller tracking system, with a fixed axis lower driven drum 10 and a compliant, variable axis tracking drum 12. The tracking drum 12 is capable of attaining a skew axis about a near center position normal to a bisector projecting through both drum centers. The bisector can be seen more fully in FIG. 3a. For the purpose of explanation in FIGS. 1 and 2 the drums are shown to be of equal diameter. The initial conditions assume a perfectly formed belt with perfectly aligned drums 10 and 12. If more than two rollers are utilized, the bisector axis would be the axis normal to the roller axis and lying in a plane that bisects the angle of the belt runs on either side of the tracking drum.

FIGS. 1 to 3 presuppose that all conditions are idealistic, i.e., a perfect belt is centrally positioned on the rollers in absolute alignment. Additionally, it must also be assumed that the frictional forces between the belt and the drums is of sufficient magnitude that the deflection of the tracking roller 12 will not result in a sideways slip between the belt and drums. If all of these conditions could be met, then inspection would reveal that the belt would trace and retrace the same path with no deviation. The restoring force to return angle X to 0 in FIG. 3b would be a combined function of the tension forces separating the two drums and the natural tendency from the warped thin sheets to release their stored energy and return to normal. Unfortunately, none of the assumed conditions can be regarded as being realistic, as under such conditions, no tracking accommodations would be necessary.

To better understand the phenomena of belt tracking as influenced by bisector roll skewing, attention is drawn to FIGS. 1 and 2. Under a skew condition as when the tracking roll is displaced through a small angle, the forces of the belt on the drum may permit relative slip between the drum and the belt. Under ideal conditions, the belt will define a path around tracking drum 12 and drive drum 10 along the line indicated as the nominal path seen in FIG. 1. In actual practice, by reason of variable tensions of the belt on the drum or slight deviation from perfect belt position due to drum or bearing wear, unequal belt tension, etc., the belt will attempt to slip sideways on the drum as seen in FIG. 1. If the conditions which allow the slip, as seen in FIG. 1, are allowed to continue the edge of the belt will define a path as seen in FIG. 2. That is, with the constant side force as assumed for this example, the belt will move a fixed increment per revolution thereof. Allowed to continue, of course, the belt would slip sideways completely off the drive and tracking drums.

Figure 3C:
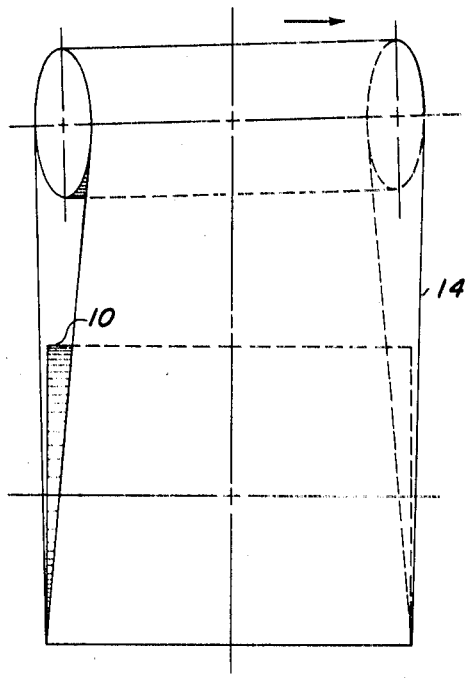

FIGS. 3a, 3b, and 3c show diagrammatically the method of accomplishing belt tracking and correction in the present application. FIG. 3a shows the tracking drum 12 and the drive drum 10 as may appear in an operating system. Drive drum 10 is shown larger in diameter than the tracking drum 12 but the invention will also accommodate a drive drum of any particular diameter and includes multiple drive rollers for the single drum 10 seen in FIG. 3a. FIG. 3a is the side view, FIG. 3b is the top view, while FIG. 3c is the front view of the tracking and drive drums with belt 14. In order to accomplish tracking with a nonstretchable belt, it is imperative that the tracking drum be pivoted about an axis perpendicular to the axis of rotation thereof, said axis bisecting the axis of the tracking drum 12. That is, the axes of rotation of the tracking drum z2 and the drive drum 10 remain in their separate parallel planes while the tracking drum pivots about said perpendicular bisector axis through its axis of rotation. This may be seen more fully in FIG. 3b which is the top view thereof. In order to accomplish tracking in a direction opposite to the skew shown in FIG. 1, the tracking drum 12 may be pivoted about the bisector axis 18. The angle as seen in FIG. 3b is the angle X to effect the desired tracking correction. FIG. 3a shows the drums 10 and 12 with the belt 14 being skewed about the bisector line and angle Y therefrom. The arrow in FIG. 3a shows the direction of rotation of drive drum 10.

The rotation of tracking drum 12 about the bisector line may result in one end of the roll moving downward to preserve the circumferential path about the upper and lower rolls. It is important in this particular application that the belt not be subjected to excessive tension which would cause stretching or tearing thereof. Many prior art tracking systems have taught the moving of the edges of the tracking drum away frog the drive drum to stretch one edge of the belt thereby adding a predetermined tension to correct the belt tracking error. In the present application, however, no belt stretching can be tolerated and thus the tracking correction is made through an axis of rotation through the tracking drug and bisecting the tracking drum belt runs rather than an axis which would allow the stretching of one end and the attendant distortion effect thereof.

As shown in FIG. 3a the angle between the belt 14 and the surface of the roller 12 can be varied by moving the axis of the roller in either direction around the bisector axis thus producing the movement in the direction of the arrow in FIG. 3c. It can be seen from FIG. 3b that a change in the angle of the roller axis relative to the belt produces a corresponding movement or drift of the belt along the surface of the roller. By adjusting the position of the axis, the belt may be tracked along the roller so that the drift or lateral movement is kept to a minimum.

FIG. 4 et seq. illustrates the belt tracking apparatus exemplifying the principles of the present invention. For ease of description and to show the apparatus in clear detail, the tracking drum 12 and belt 14 are shown in phantom. The view of FIG. 4 is defined as from the "front" only for ease of description, as it is obvious that the other side could also be called the front without deviating from any principles of the present invention. Shown in FIG. 4 are the left floating plate end support 50 and the right floating plate end support 52. The left and right floating plate end supports 50 are shown to be rigidly mounted to the floating plate 54. By means of flexural cantilever pivots 56 and 58, the front steering arm 60 and rear steering arm 62 are movably mounted to the floating plate end supports 50 and 52, respectively. The tracking drum 12 is rotatably mounted on the front and rear steering arms 60 and 62 by means of the tracking drum shaft 64. The tracking drum shaft 64 is mounted in the front steering arm 60 by means of end bearing 66 and in the rear steering arm by means of end bearing 68.

Fixedly mounted onto floating plate 54 is the bias adjustment plate 70. The bias adjustment plate is utilized to retain one end of bias spring 72, the other end of which is coupled to one part of center point arm 74. Center point arm 74 is rotatably mounted onto floating plate 54 at the center point of the arm at point 76. The center point arm 74 is attached to the front and rear steering arms 60 and 62 at adjustable pivots 78 and 80, respectively. The pivots 78 and 80 are adjustable by adjustable screws 82 and 84 to allow the accurate placement of the center point arm within the holes in the front and rear steering arms. The adjustable pivots 78 and 80 are spherical bearing pivots, well known in the art, to allow the movement of the center point arm around point 76 while the front and rear arms 60 and 62 rotate about their respective flexural cantilever pivots 56 and 58, respectively.

Figure 5:
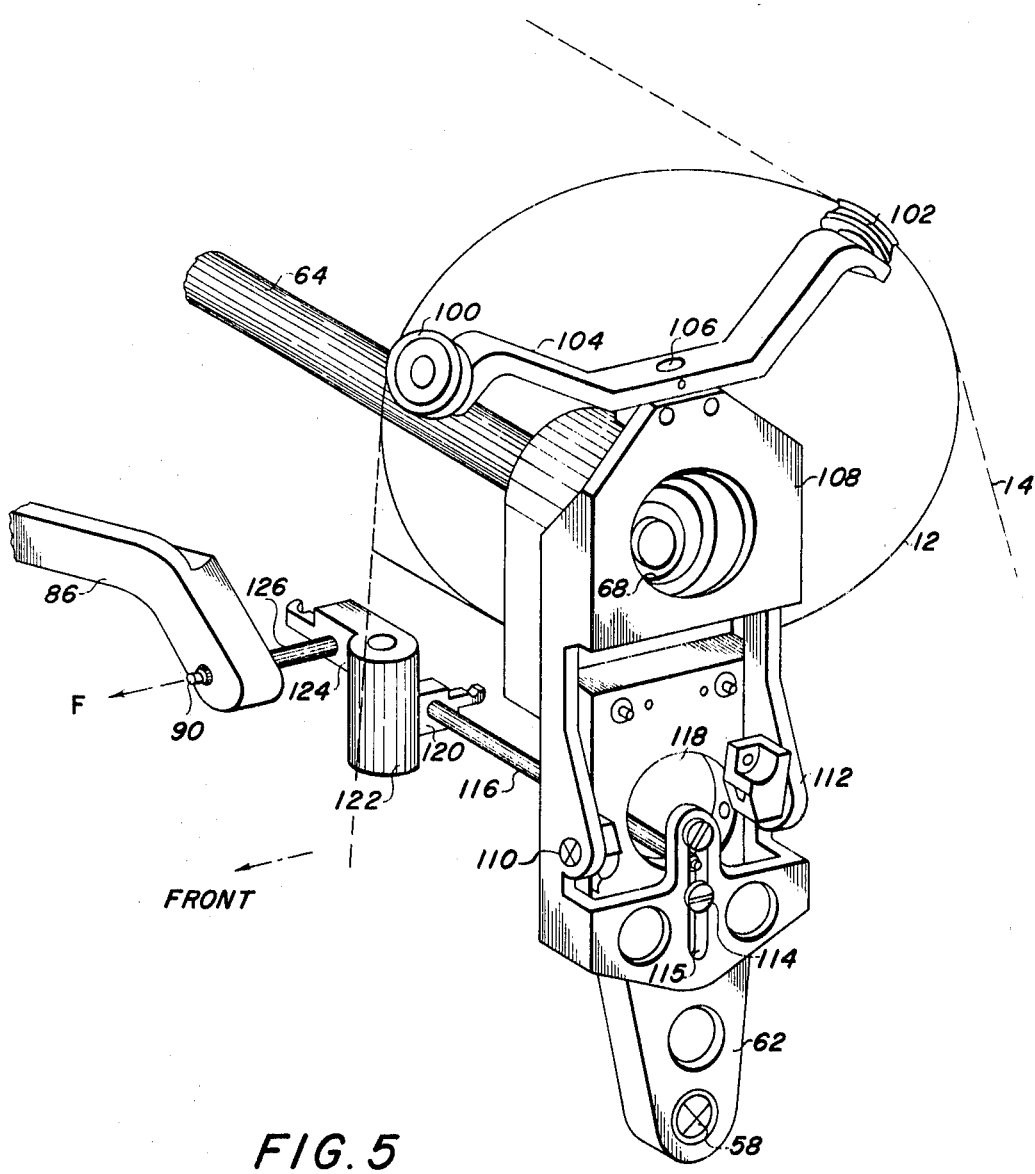
FIG. 5 is an elevational view of the belt tracking assembly as seen from the right front thereof.

Ratio arm 86 is seen to be rotatably mounted on floating plate 54 about the ratio arm pivot 88. The right hand portion of the ratio arm 86 is bent downward at an angle to extend below the floating plate 54 as shown. Apparatus which will be seen more clearly in conjunction with FIG. 5 is utilized to contact the end of the ratio arm at the contact point 90 in the direction shown by the arrow designated F. As point 90 is moved in the direction F, the ratio arm pivots around pivot point 88. For the movement of point 90, there is movement also at point 92, the ratio arm heel. Coupled to the ratio arm heel is the push rod 94 which is coupled to the other side of the center point arm from the point of contact of the bias spring.

FIG. 4 operates in conjunction with the apparatus shown in FIG. 5. The tracking correction motion would be transmitted through the linkage in FIG. 5 to contact point 90 on the ratio arm 66. The force would be exerted through the ratio arm to the ratio arm heel point 92. This motion is transmitted to the center point arm 74 by means of the push rod 94. Center point arm 74 is rotated about pivot point 76 and around the bisector axis 96 passing therethrough. With center point arm 74 rotating about axis 96, the motion is further transmitted to the front steering arm 60 which would rotate about point 56 in a direction into the paper. The other end of center point arm 74 would be moving out of the paper and against the force of bias spring 72. This rotating action about axis 96 will cause the belt 14 to be recentered about its optimum operating path.

FIG. 5 shows the actual belt sensing apparatus for use in conjunction with FIG. 4. Again, tracking drum 12 and the belt 14 are shown in phantom for purposes of illustration in this figure. The front direction of the apparatus in FIG. 5 is shown again so as to illustrate the relative positions of the several figures. Sensing rolls 100 and 102 contact the edge of the belt 14 by means of indentations in the sensing rolls themselves. The sensing rolls 100 and 102 are coupled to a flexural pivot point 106 by means of the toggle arm 104. The toggle arm is allowed to pivot around the axis through the pivot 106 in order to accurately determine the tracking of belt 14. The toggle arm is pivotally mounted on the mechanical ratio plate 108. The mechanical ratio plate 108 has a pivot axis through points 110 and 112. Thus, when the sensing rolls determine movement of the belt in either direction along the tracking drum shaft 64, the mechanical ratio plate 62 will pivot about the axis through points 110 and 112. Coupled to the mechanical ratio plate by means of ratio adjustment 114 is a push rod 116 which passes through the hole in the rear steering arm 62 to contact one arm 120 of the ratio crank 122. The ratio crank 122 pivots about the axis shown in response to the movement of the push rod 116 coupled to the mechanical ratio plate 108. The ratio crank pivots about the axis and the other arm thereof 124 is coupled to still another push rod 126 which is coupled to the contact point 90 on ratio arm 86. Due to the small diameter of the sensing rolls, wear may be excessive. A larger single roller or rollers may be substituted and still effect accurate belt tracking.

The complete operation, therefore, of the belt tracking mechanism is as follows. The belt movement is sensed by the sensing rolls 100 and 102. The movement of the belt along the direction of the axis of tracking drum shaft 64 is transmitted through the toggle arm 104 to the mechanical ratio plate 108. The ratio plate 108 pivots about the pivot points 110 112 122 thereby transmitting this transverse movement of the belt to the push rod 116. Push rod 116 coupled to arm 120 of ratio crank 122 causes the ratio crank 122 to pivot about the axis shown. The other arm 124 of the ratio crank 122 transmits the motion through 90° and by push rod 126 exerts the force against point 90 of ratio arm 86. In FIG. 4 the movement of ratio arm 86 is transmitted about point 88 and by means of push rod 94 to the center point arm 74. By means of adjustable pivots 78 and 80, the front and rear steering arms, and thus the upper tracking drum 12, is seen to rotate about points 56 and 58, thereby correcting the tracking error first detected by the sensing rolls 100 and 102.

With the steering arms 50 and 52 being equally pivotal in either direction, the tracking drum 12 during tracking operation will rock about an axis lying on the bisector plane and positioned intermediate the ends of the roller. For tracking then such skew action of the roller will effect an angular relationship of the roller relative to the direction of movement of the belt thereby causing the same to steer or follow the roller surface and be displaced laterally in order to return the belt back to a centered position rather than exerting pressure on the belt adjacent one edge portion thereof. In this manner pressure is applied equally to all portions of the belt affected during tracking action thereby minimizing the tendency of the tracking arrangement to adversely affect belt structure by exerting undue pressures of the belt structure adjacent one edge or the portion between the midline of the belt and one edge. With the axis of pivoting of the roller lying on the bisecting plane for the planes of the selenium belt runs, the deflection of the ends of the roller occurs in opposite directions to provide maximum belt correction with minimum roller skewing. Preferably the roller is covered with a rubber coating which would prevent slippage of the belt as it steers during tracking. During rocking of the shaft 64, both edges of the belt are affected equally and, as the skewing increases during tracking action, any tendency of the belt to lessen in circumference will cause movement of the roller 12 inwardly against the tension of the spring 160 in FIG. 7, which serves as a shock absorber for tracking action.

Many adjustment points for the various points of contact in precisely determining the ratio of belt movement to tracking correction can be made and are seen in the various figures. In FIG. 5, the ratio adjustment 114 allows the up and down movement in slot 115 of the adjustment for push rod 116. By adjusting the push rod up or down in the slot 115 the amount of movement transmitted to the push rod can be precisely determined. The ratio crank itself could have adjustments on it for transmitting the movement about the 90° to the ratio arm 86. In FIG. 4, the bias adjustment plate 70 can be adjusted for spring tension and compression and also for lateral movement to more fully adjust the tracking correction. Other corrections can be made by those skilled in the art by varying the point of contact, length of travel, etc., of the various components to accurately determine the tracking correction.

Figure 6:
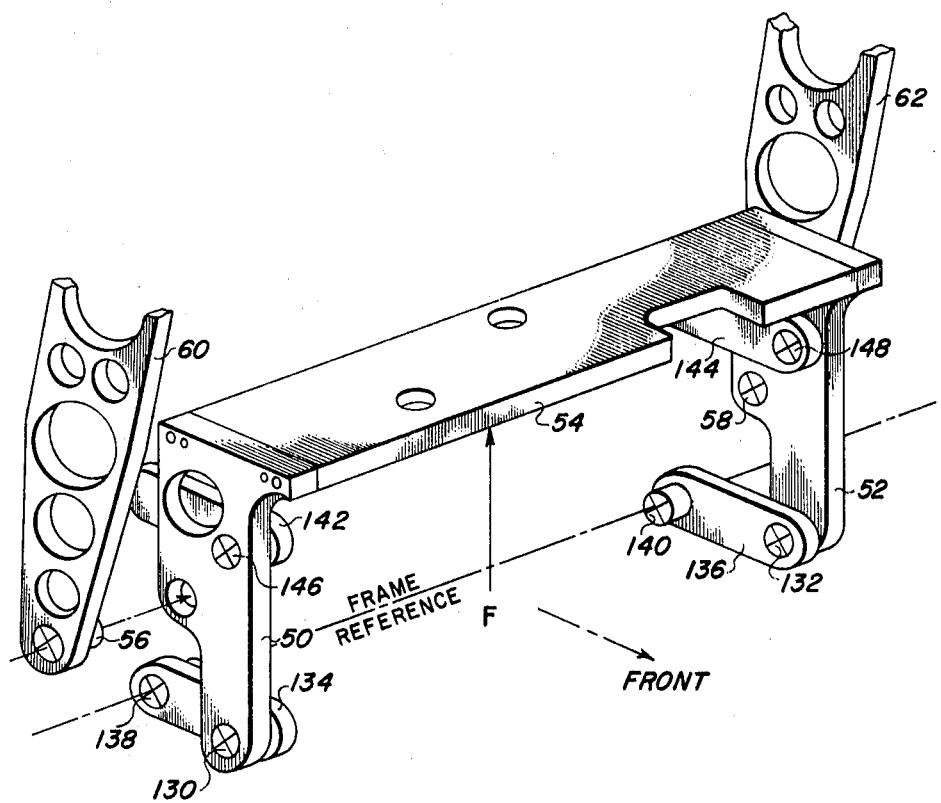
FIG. 6 is an elevational view of the steering unit suspension apparatus.

The above discussion has described FIGS. 1 to 5 in accordance with the principles of the present invention. In order, however, to allow for insertion and removal of the belt 14 from the tracking roll 12 and the lower drive roll or rolls, provisions are made in FIGS. 6 and 7 for the lowering of the floating plate 54 and thus the tracking roll 12 to reduce the tension on belt 14 thereby enabling the belt to be removed. FIG. 6 shows the front steering arm 60 and the rear steering arm 62 being placed on left and right floating plate end supports 50 and 52, by means of flexural pivot points 56 and 58, respectively. At the lower extremity of the left and right floating plate end supports are flexural pivots 130 and 132. These flexural pivots are coupled to links 134 and 136, the other ends of which are coupled by further flexural pivots 138 and 140 to the frame of the apparatus. Further links 142 and 144 couple the frame to the left and right floating plate end supports 50 and 52 by means of pivots 146 and 148 respectively. Thus, a vertical force $F_s$, as shown, forces the floating plate upward and pivoting about the axes of the various flexural pivots in links 134, 136, 142, and 144. This force is transmitted through the left and right floating plate end supports 50 and 52 through the front and rear steering arms 60 and 62 to the tracking drum 12, thereby keeping the predetermined tension on the belt 14.

Figure 7:
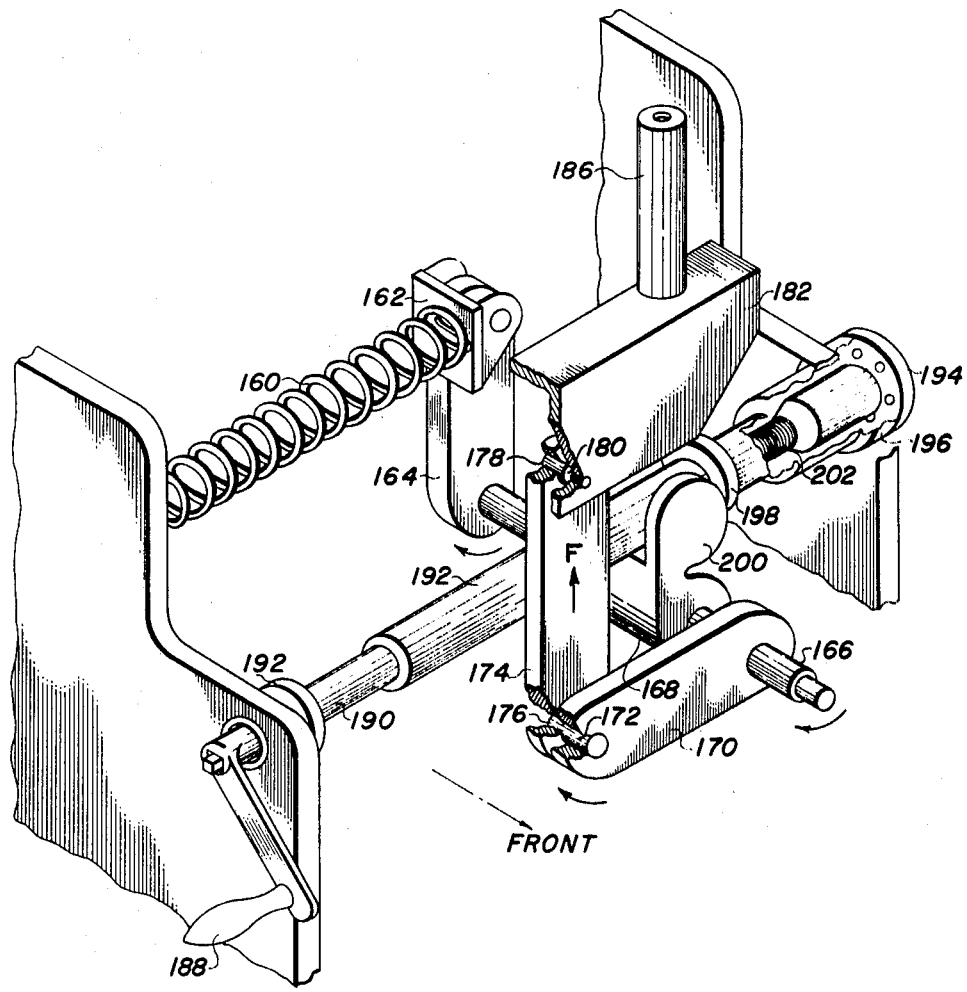
FIG. 7 is an elevational view of the tension assembly for use with the system in FIGS. 4 and 5.

FIG. 7 shows the application of the force $F_s$ for adjustably applying the tension force to the belt 14 for operating tension and also for insertion and removal of the belt from the apparatus. As seen in FIG. 7, tension spring 160 applies a predetermined force to tension pivot 162, which is mounted on arm 164 by aligning the holes in pivot 162 and arm 164 by a bolt or other means. The other end of the arm 164 reaches the shaft 166 containing crank assembly 168. The other end of shaft 166 is coupled to arm 170 which transmits the rotating movement to point 172 on arm 170. The shaft 172 is coupled to transfer link 174 at point 176. The other end 178 of transfer link 174 couples unit 180 which is fixedly mounted on the tension base z82. Fixedly mounted on tension base 182 are support shafts 184 and 186 which are attached to the underneath of the floating plate 54 thereby controlling the up and down movement of the floating plate.

By means of the arrows shown, the force of tension spring 160 can be traced to apply the necessary tension to floating plate 54. The force of tension spring 160 applies a force in the clockwise direction to arm 164 by means of tension pivot 162. Shaft 166 couples the clockwise rotation movement to the arm 170 attached to the other end of shaft 166. Shaft 170 also moves in a clockwise direction but now displaced 90° along shaft 166. By means of connection 172 transfer link 176 transfers the force of tension spring 160 to the connection 180 fixedly attached to the tension base 182 and therefrom to the floating plate 54 by means of support shafts 184 and 186.

Adjustment of the tension for operation and insertion and removal of the belt is made by the service crank 188 and associated components. The service crank 188 is mounted on shaft 190 through the jack hub 192. Shaft 190 is adjustably coupled to jack shaft 191 by means of screw threads or other connection method. The other end of jack shaft 192 is coupled to pilot connection 194 by means of jack pilot connection 196. Jack hub 192 and jack pilot 196 are connected to the frame of the system as a reference point.

On the jack shaft 192 is a shoulder ring 198 which is fixedly mounted on shaft 192. The crank assembly 168 straddles shaft 192 and the edges 200 are biased against shoulder 198 by means of the force of the tension spring 160. As the service crank 188 is rotated in a clockwise or counterclockwise direction, the jack shaft 192 is screwed onto or off of screw connection 202 on the pilot connection 194. The action of the service crank 188 on the screw terminals 202 cause the jack shaft 192 and thus the shoulder 198 to be moved axially in the direction of the shaft 192. Such a movement allows the crank assembly 200 and the force of the tension spring 160 upon it to move accordingly with the shoulder along the axis of shaft 192. This movement by the crank assembly 200 accordingly transfers the motion of the service crank to the transfer link 174 through the tension base 182 and support shafts 184 and 186 to the floating plate. Thus, if the service crank is turn in a clockwise direction the support shaft 186 will be caused to rise thereby exerting tension on belt 14 through the tracking drum 12. When the service crank is moved in a counterclockwise direction the crank assembly is withdrawn along the axis of shaft 192 thereby lowering support shaft and reducing the tension on the belt 14. Continuous rotation of the service crank 188 will allow the withdrawal of the tracking drum 12 from the belt 14 to allow for insertion or removal of the belt from the system.

In the foregoing there has been disclosed apparatus for effectively positioning a continuous belt about drive rollers by utilizing a tracking drum and associated apparatus. The system has been set forth in conjunction with a drive drum and a tracking drum but it is apparent that a plurality of drive drums could be utilized and still retain the principles of the present invention. Specific embodiments have been disclosed and described as to the physical size of the mechanical linkage, but other configurations could be utilized to effect different positioning ratios in accordance with different size drums and belt lengths. Further, a drive drum has been disclosed and it is obvious that support means and drive means therefor would be necessary in conjunction with the drive drum and also the tracking drum in the system. For ease of illustration, however, such support apparatus has not been shown to concentrate on the belt tracking apparatus of the present invention. Additionally, the present application has been described in conjunction with a selenium xerographic belt. The invention may incorporate, however, any belt and associated apparatus wherein a belt tracking system is necessary.

Thus, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What I claim is:

1. Apparatus for maintaining the transverse alignment of a moving belt comprising:
   a plurality of rollers forming a path of movement for said belt,
   a first steering arm having one end of one of said rollers rotatably mounted therein,
   a second steering arm having the opposite end of said one of said rollers rotatably mounted therein,
   means for pivotally mounting said second steering arm with respect to said first steering arm, said pivotally mounting means including:
     a floating plate with end supports mounted thereon being coupled to a reference frame,
     a flexural cantilever pivot in each said end support for pivotally supporting said first and second steering arms,
     a center point arm rotatably mounted on said floating plate at the center point of said arm, the ends of said center point arm being pivotally coupled to said first and second steering arms,
   sensing means mounted adjacent said path of movement for contacting said belt and detecting the lateral movement thereof, and
   linkage means coupled to said sensing means for pivoting said center point arm about said center point to move said second steering arm with respect to said first steering arm in response to said detected lateral movement of said belt.

2. The apparatus as defined in claim 1 wherein the sensing means includes at least one member rotatably mounted on an actuating arm forming part of the linkage means, said member being rotated by contact with the edge of the belt to reduce friction between the belt and the member.

3. Apparatus for maintaining the transverse alignment of a moving belt member comprising:
   a plurality of roller members defining a path of travel along which said belt member is advanced,
   a first support member having one end of one of said roller members rotatably mounted therein,
   a second support member having the opposite end of said one of said roller members rotatably mounted therein,
   means for supporting said first and second support members in relative pivotal relationship, said supporting means comprising:
     a floating plate with a flexural cantilever pivot at each end thereof for pivotally supporting said first and second support members,
     a center point arm rotatably mounted on said floating plate at the center point of said arm, the ends of said center point arm being operatively coupled to said first and second support members,
     a ratio arm pivotally mounted on said floating plate, one end of said ratio arm being operatively coupled to said center point arm for exerting a force thereon to rotate said arm about said center point thereof,
   means normally biasing said center point arm and thus said first and second support members and the ends of said one of said roller members mounted therein in a direction about said supporting means to produce a transverse movement in a predetermined direction of said belt member in relation to said roller members,
   means adjacent said path of travel to sense the transverse positioning of said belt member, and
   means responsive to said sensing means for producing a movement of said first and second support members and the ends of said one of said roller members mounted therein about said supporting means to produce a compensating transverse movement of said belt member, said movement producing means including linkage means coupled to said sensing means for transmitting the transverse movement of said belt member to the other end of said ratio arm.

4. Apparatus for maintaining the transverse alignment of a moving belt comprising:
   a tracking drum adapted to rotate around its longitudinal axis for guiding said belt along its path of movement,
   a first steering arm having one end of said tracking drum rotatably mounted therein,
   a second steering arm having the opposite end of said tracking drum rotatably mounted therein,
   a plate member with first and second end plates thereon for pivotally mounting said first and second steering arms respectively thereto along an axis substantially parallel to the tracking drum axis of rotation, said tracking drum axis and said pivotal axis defining a plane arranged to bisect the angle between the planes of the belt runs on either side of said tracking drum,
   control means for pivotally actuating said steering arms in opposite directions about a pivotal axis in said bisector plane and normal to the axis of said tracking drum in response to a deviation of the belt from said path of movement,
   sensing means mounted adjacent said path of movement for contacting said belt and detecting the lateral movement thereof, and
   linkage means operatively connecting said sensing means and said control means to actuate said control means in response to said detected lateral movement of said belt.

5. The apparatus as set forth in claim 4 wherein said control means includes:
a center point arm rotatably mounted on said plate member at the center point of said arm, the ends of said center point arm being operatively coupled to said first and second steering arms.

6. The apparatus as set forth in claim 5 further including:
means for normally biasing said control means in a direction about said pivotal axis to produce a center point about which said belt is transversely aligned.

7. The apparatus as set forth in claim 6 further including:
means for operatively coupling said first and second end plates on said plate member to a reference frame,
second linkage means operatively coupled to said plate member for effecting a tension force to said belt through said tracking drum, and
spring means coupled to said reference frame and said second linkage means for producing said tension force.

8. The apparatus as set forth in claim 7 further including:
crank means for manually operating said second linkage means for selectively applying said tension force to said belt.

9. The apparatus as set forth in claim 5 wherein said linkage means includes:
ratio plate means coupled to said sensing means for transferring the lateral movement detected by said sensing means to a point separated from said sensing means,
ratio crank means operatively coupled to said ratio plate means to transfer said lateral movement about a predetermined angle, and
ratio arm means operatively coupled to said ratio crank means for further transferring said lateral movement to said center point arm to effect said transverse alignment of said belt.

10. The apparatus as set forth in claim 1 wherein said linkage means comprises:
a ratio plate coupled to said sensing means for receiving the lateral movement of said belt,
a ratio arm pivotally mounted on said floating plate for transferring said movement to said center point arm, and
means responsive to the transverse movement of said ratio plate to effect said movement of said ratio arm about its pivot point on the floating plate.